US00RE42681E

(19) United States
(12) Reissued Patent
Dabak et al.

(10) Patent Number: US RE42,681 E
(45) Date of Reissued Patent: Sep. 6, 2011

(54) WIRELESS SYSTEM WITH TRANSMITTER HAVING MULTIPLE TRANSMIT ANTENNAS AND COMBINING OPEN LOOP AND CLOSED LOOP TRANSMIT DIVERSITIES

(75) Inventors: Anand G. Dabak, Plano, TX (US); Srinath Hosur, Plano, TX (US)

(73) Assignee: Texas Instruments Incorporated, Dallas, TX (US)

(21) Appl. No.: 11/124,595

(22) Filed: May 5, 2005

Related U.S. Patent Documents

Reissue of:
(64) Patent No.: 6,594,473
Issued: Jul. 15, 2003
Appl. No.: 09/578,004
Filed: May 24, 2000

U.S. Applications:
(60) Provisional application No. 60/136,413, filed on May 28, 1999.

(51) Int. Cl.
*H03C 7/02* (2006.01)
*H04B 1/02* (2006.01)
*H04B 7/02* (2006.01)

(52) U.S. Cl. ..... 455/101; 455/103; 455/132; 455/133; 370/201; 370/209; 370/334; 370/339; 370/441; 375/141; 375/146; 375/147; 375/148; 375/267

(58) Field of Classification Search ..... 455/101, 455/103, 132, 133; 370/201, 209, 334, 339, 370/441, 342; 375/141, 146, 157, 148, 267
See application file for complete search history.

(56) References Cited

U.S. PATENT DOCUMENTS

| | | | | |
|---|---|---|---|---|
| 4,564,952 | A * | 1/1986 | Karabinis et al. | 375/232 |
| 5,259,003 | A * | 11/1993 | Berger et al. | 375/260 |
| 5,953,659 | A * | 9/1999 | Kotzin et al. | 455/277.1 |
| 6,122,529 | A * | 9/2000 | Sabat et al. | 455/11.1 |
| 6,144,696 | A * | 11/2000 | Shively et al. | 375/222 |
| 6,154,485 | A * | 11/2000 | Harrison | 375/130 |
| 6,178,196 | B1 * | 1/2001 | Naguib et al. | 375/148 |
| 6,181,955 | B1 * | 1/2001 | Dartois | 342/368 |
| 6,185,258 | B1 * | 2/2001 | Alamouti et al. | 375/260 |
| 6,317,411 | B1 * | 11/2001 | Whinnett et al. | 370/204 |
| 6,327,299 | B1 * | 12/2001 | Meszko | 375/149 |
| 6,327,603 | B1 * | 12/2001 | Niu et al. | 708/405 |
| 6,351,759 | B1 * | 2/2002 | Moretti et al. | 708/405 |
| 6,356,528 | B1 * | 3/2002 | Lundby et al. | 370/209 |
| 6,389,085 | B1 * | 5/2002 | Salt | 375/347 |
| 6,424,642 | B1 * | 7/2002 | Schmidl et al. | 370/342 |
| 6,424,679 | B1 * | 7/2002 | Dabak et al. | 375/267 |
| 6,449,314 | B1 * | 9/2002 | Dabak et al. | 375/267 |
| 6,594,473 | B1 * | 7/2003 | Dabak et al. | 455/101 |
| 6,625,197 | B1 * | 9/2003 | Lundby et al. | 375/130 |
| 6,804,311 | B1 * | 10/2004 | Dabak et al. | 375/347 |
| 2001/0038617 | A1 * | 11/2001 | Schmidl et al. | 370/335 |

* cited by examiner

*Primary Examiner* — Stephen M D'Agosta
(74) *Attorney, Agent, or Firm* — Ronald O. Neerings; Wade James Brady, III; Frederick J. Telecky, Jr.

(57) ABSTRACT

A wireless communication system (40). The system comprises transmitter circuitry (42) comprising encoder circuitry (44) for receiving a plurality of symbols ($S_i$). The system further comprises a plurality of antennas (AT1-AT4) coupled to the transmitter circuitry and for transmitting signals from the transmitter circuitry to a receiver (UST), wherein the signals are responsive to the plurality of symbols. Further, the encoder circuitry is for applying open loop diversity and closed loop diversity to the plurality of symbols to form the signals.

78 Claims, 4 Drawing Sheets

WIRELESS SYSTEM WITH TRANSMITTER HAVING MULTIPLE TRANSMIT ANTENNAS AND COMBINING OPEN LOOP AND CLOSED LOOP TRANSMIT DIVERSITIES

Matter enclosed in heavy brackets [ ] appears in the original patent but forms no part of this reissue specification; matter printed in italics indicates the additions made by reissue.

CROSS-REFERENCES TO RELATED APPLICATIONS

*More than one reissue application has been filed for the reissue of U.S. Pat. No. 6,594,473. The reissue applications are application Ser. No. 11/287,564 and the instant reissue application.*

This application claims the benefit, under 35 U.S.C. §119 (e)(1), of U.S. Provisional Application No. 60/136,413, filed May 28, 1999, and incorporated herein by this reference.

STATEMENT REGARDING FEDERALLY SPONSORED RESEARCH OR DEVELOPMENT

Not Applicable.

BACKGROUND OF THE INVENTION

The present embodiments relate to wireless communications systems and, more particularly, to transmitters with multiple transmit antennas used in such systems.

Wireless communications have become very prevalent in business, personal, and other applications, and as a result the technology for such communications continues to advance in various areas. One such advancement includes the use of spread spectrum communications, including that of code division multiple access ("CDMA") and wideband code division multiple access ("WCDMA") cellular communications. In such communications, a user station (e.g., a hand held cellular phone) communicates with a base station, where typically the base station corresponds to a "cell."

Due to various factors including the fact that CDMA communications are along a wireless medium, an originally transmitted communication from a base station to a user station may arrive at the user station at multiple and different times. Each different arriving signal that is based on the same original communication is said to have a diversity with respect to other arriving signals originating from the same transmitted communication. Further, various diversity types may occur in CDMA communications, and the CDMA art strives to ultimately receive and process the originally transmitted data by exploiting the effects on each signal that are caused by the one or more diversities affecting the signal.

One type of CDMA diversity occurs because a transmitted signal from the base station is reflected by objects such as the ground, mountains, buildings, and other things that it contacts. As a result, a same single transmitted communication may arrive at the receiver at numerous different times, and assuming that each such arrival is sufficiently separated in time, then each different arriving signal is said to travel along a different channel and arrive as a different "path." These multiple signals are referred to in the art as multiple paths or multipaths. Several multipaths may eventually arrive at the user station and the channel traveled by each may cause each path to have a different phase, amplitude, and signal-to-noise ratio ("SNR"). Accordingly, for one communication between one base station and one user station, each multipath is a replica of the same user information, and each path is said to have time diversity relative to other mulitpath(s) due to the difference in arrival time which causes different (uncorrelated) fading/noise characteristics for each multipath. Although multipaths carry the same user information to the receiver, they may be separately recognized by the receiver based on the timing of arrival of each multipath. More particularly, CDMA communications are modulated using a spreading code which consists of a series of binary pulses, and this code runs at a higher rate than the symbol data rate and determines the actual transmission bandwidth. In the current industry, each piece of CDMA signal transmitted according to this code is said to be a "chip," where each chip corresponds to an element in the CDMA code. Thus, the chip frequency defines the rate of the CDMA code. Given the use of transmission of the CDMA signal using chips, then multipaths separated in time by more than one of these chips are distinguishable at the receiver because of the low autocorrelations of CDMA codes as known in the art.

In contrast to multipath diversity which is a natural phenomenon, other types of diversity are sometimes designed into CDMA systems in an effort to improve SNR, thereby improving other data accuracy measures (e.g., bit error rate ("BER"), frame error rate ("FER"), and symbol error rate ("SER")). An example of such a designed diversity scheme is antenna diversity and is introduced here since it has particular application to the preferred embodiments discussed later. Antenna diversity, or sometimes referred to as antenna array diversity, describes a wireless system using more than one antenna by a same station. Antenna diversity often proves useful because fading is independent across different antennas. Further, the notion of a station using multiple antennas is more typically associated with a base station using multiple antennas to receive signals transmitted from a single-antenna mobile station, although more recently systems have been proposed for a base station using multiple antennas to transmit signals transmitted to a single-antenna mobile station. Each of these alternatives is further explored below.

Certain antenna array diversity techniques suggest the use of more than one antenna at the receiver, and this approach is termed receive antenna diversity. For example, in prior art analog systems, often a base station receiver was equipped with two antennas, each for receiving a signal from a single-antenna mobile station. Thus, when the single-antenna mobile station transmits to the base station, each receiver antenna provides at least one corresponding received signal for processing. By implementing multiple receive antennas, the performance of an ideal receiver is enhanced because each corresponding received signal may be separately processed and combined for greater data accuracy.

More recently there have been proposals to use more than one antenna at the transmitter, and this approach is termed transmit antenna diversity. For example, in the field of mobile communications, a base station transmitter is equipped with two antennas for transmitting to a single-antenna mobile station. The use of multiple antennas at the base station for transmitting has been viewed as favorable over using multiple antennas at the mobile station because typically the mobile station is in the form of a hand-held or comparable device, and it is desirable for such a device to have lower power and processing requirements as compared to those at the base station. Thus, the reduced resources of the mobile station are less supportive of multiple antennas, whereas the relatively high-powered base station more readily lends itself to antenna diversity. In any event, transmit antenna diversity also provides a form of diversity from which SNR may be improved over single antenna communications by separately processing and combining the diverse signals for greater data accuracy at the receiver. Also in connection with transmit antenna diversity and to further contrast it with multipath diversity described above, note that the multiple transmit antennas at a single station are typically within several meters (e.g., three to four meters) of one another, and this spatial relationship is also sometimes referred to as providing spatial diversity. Given the spatial diversity distance, the same signal transmitted by each antenna will arrive at a destination (assuming no other diversity) at respective times that relate to the distance between the transmitting antennas. However, the difference between these times is considerably smaller than the width of a chip and, thus, the arriving signals are not separately distinguishable in the same manner as are multipaths described above.

Given the development of transmit antenna diversity schemes, two types of signal communication techniques have evolved to improve data recognition at the receiver given the transmit antenna diversity, namely, closed loop transmit diversity and open loop transmit diversity. Both closed loop transmit diversity and open loop transmit diversity have been implemented in various forms, but in all events the difference between the two schemes may be stated with respect to feedback. Specifically, a closed loop transmit diversity system includes a feedback communication channel while an open loop transmit diversity system does not. Both of these systems as well as the distinction between them are further detailed below.

FIG. 1 illustrates a prior art closed loop transmit antenna diversity system 10 including a transmitter 12 and a receiver 14. By way of example, assume that transmitter 12 is a base station while receiver 14 is a mobile station. Also, for the sake of simplifying the discussion, each of these components is discussed separately below. Lastly, note that the closed loop technique implemented by system 10 is sometimes referred to in the art as a transmit adaptive array ("TxAA"), while other closed loop techniques also should be ascertainable by one skilled in the art.

Transmitter 12 receives information bits $B_i$ at an input to a channel encoder 13. Channel encoder 13 encodes the information bits $B_i$ in an effort to improve raw bit error rate. Various encoding techniques may be used by channel encoder 13 and as applied to bits $B_i$, with examples including the use of convolutional code, block code, turbo code, or a combination of any of these codes. The encoded output of channel encoder 13 is coupled to the input of an interleaver 15. Interleaver 15 operates with respect to a block of encoded bits and shuffles the ordering of those bits so that the combination of this operation with the encoding by channel encoder 13 exploits the time diversity of the information. For example, one shuffling technique that may be performed by interleaver 15 is to receive bits in a matrix fashion such that bits are received into a matrix in a row-by-row fashion, and then those bits are output from the matrix to a symbol mapper 16 in a column-by-column fashion. Symbol mapper 16 then converts its input bits to symbols, designated generally as $S_i$. The converted symbols $S_i$ may take various forms, such as quadrature phase shift keying ("QPSK") symbols, binary phase shift keying ("BPSK") symbols, or quadrature amplitude modulation ("QAM") sybmols. In any event, symbols $S_i$ may represent various information such as user data symbols, as well as pilot symbols and control symbols such as transmit power control ("PC") symbols and rate information ("RI") symbols. Symbols $S_i$ are coupled to a modulator 18. Modulator 18 modulates each data symbol by combining it with, or multiplying it times, a CDMA spreading sequence which can be a pseudonoise ("PN") digital signal or PN code or other spreading codes (i.e., it utilizes spread spectrum technology). In any event, the spreading sequence facilitates simultaneous transmission of information over a common channel by assigning each of the transmitted signals a unique code during transmission. Further, this unique code makes the simultaneously transmitted signals over the same bandwidth disinguishble at receiver 14 (or other receivers). Modulator 18 has two outputs, a first output $\mathbf{18}_1$ connected to a multiplier $\mathbf{20}_1$ and a second output $\mathbf{18}_2$ connected to a multiplier $\mathbf{20}_2$. Each of multipliers $\mathbf{20}_1$ and $\mathbf{20}_2$ multiplies its input times a weight value, $W_1$ and $W_2$, respectively, and provides an output to a respective transmit antenna $A\mathbf{12}_1$ and $A\mathbf{12}_2$. By way of example, assume that transmit antennas $A\mathbf{12}_{1\ and\ A12}{}_2$ are approximately three to four meters apart from one another.

Receiver 14 includes a receive antenna $A\mathbf{14}_1$ for receiving communications from both of transmit antennas $A\mathbf{12}_1$ and $A\mathbf{12}_2$. Recall that such communications may pass by various multipaths, and due to the spatial relationship of transmit antennas $A\mathbf{12}_1$ and $A\mathbf{12}_2$, each multipath may include a communication from both transmit antenna $A\mathbf{12}_1$ and transmit antenna $A\mathbf{12}_2$. In the illustration of FIG. 1, a total of j multipaths are shown. Further, each multipath will have a fading channel parameter associated with it, that is, some value that reflects the channel effects on the signal carried by the channel. By way of reference, the character $\alpha$ is used in this document to identify this fading parameter; moreover, in FIG. 1, the convention $\alpha_i^j$ is used, where i=1 identifies a path transmitted by the antenna $A\mathbf{12}_1$, i=2 identifies a path transmitted by the antenna $A\mathbf{12}_2$, and j identifies the multipath. Within receiver 14, signals received by antenna $A\mathbf{14}_1$ are connected to a despreader 22. Despreader 22 operates according to known principles, such as by multiplying the CDMA signal times the CDMA code for receiver 14, thereby producing a despread symbol stream at its output and at the symbol rate. The despread signals output by despreader 22 are coupled to an open loop diversity decoder 23, and also to a channel estimator 24. Channel estimator 24 determines estimated channel impulse responses based on the incoming despread data. Further, channel estimator 24 provides two outputs. A first output $\mathbf{24}_1$ from channel estimator 24 outputs the estimated channel impulse responses to open loop diversity decoder 23. In response to receiving the estimates, open loop diversity decoder 23 applies the estimates to the despread data received from despreader 22; further in this regard and although not separately shown, the application of the estimate to the data may be by way of various methods, such as maximal ratio combining (MRC) and using a rake receiver. A second output 242 from channel estimator 24 communicates the estimates, or values derived from those estimates, back to transmitter 12 via a feedback channel. These feedback values are the weights $W_1$ and $W_2$ described above with respect to multipliers $\mathbf{20}_1$ and $\mathbf{20}_2$ of transmitter 12.

Returning to open loop diversity decoder 23 of receiver 14, once it applies the estimates to the despread data, its result is output to a deinterleaver 25 which operates to perform an inverse of the function of interleaver 15, and the output of deinterleaver 25 is connected to a channel decoder 26. Channel decoder 26 may include a Viterbi decoder, a turbo decoder, a block decoder (e.g., Reed-Solomon decoding), or still other appropriate decoding schemes as known in the art. In any event, channel decoder 26 further decodes the data received at its input, typically operating with respect to certain error correcting codes, and it outputs a resulting stream of decoded symbols. Indeed, note that the probability of error for data input to channel decoder 26 is far greater than that after processing and output by channel decoder 26. For example, under current standards, the probability of error in the output of channel decoder 26 may be between $10^{-3}$ and $10^{-6}$. Finally, the decoded symbol stream output by channel decoder 26 may be received and processed by additional circuitry in receiver 14, although such circuitry is not shown in FIG. 1 so as to simplify the present illustration and discussion.

Having detailed system 10, attention is now returned to its identification as a closed loop system. Specifically, system 10 is named a closed loop system because, in addition to the data communication channels from transmitter 12 to receiver 14, system 10 includes the feedback communication channel for communicating weights $W_1$ and $W_2$ from receiver 14 to transmitter 12; thus, the data communication and feedback communication channels create a circular and, hence, "closed" loop system. Note further that weights $W_1$ and $W_2$ may reflect various channel affecting aspects. For example, receiver 14 may ascertain a level of fading in signals it receives from transmitter 12, such as may be caused by local interference and other causes such as the Doppler rate of receiver 14 (as a mobile station), and in any event where the fading may be characterized by Rayleigh fading. As a result, receiver 14 feeds back weights $W_1$ and $W_2$ and these weights are used by multipliers $\mathbf{20}_1$ and $\mathbf{20}_2$, thereby applying weight $W_1$ to various symbols to provide a transmitted signal along transmitter antenna $A\mathbf{12}_1$ and applying weight $W_2$ to various symbols to provide a transmitted signal along transmitter antenna $A\mathbf{12}_2$. Thus, for a first symbol $S_1$ to be transmitted by station 12, it is transmitted as part of a product $W_1S_1$ along transmitter antenna $A\mathbf{12}_1$ and also as part of a product $W_2S_2$ along transmitter antenna $A\mathbf{12}_2$. By way of illustration, therefore, these weighted products are also shown in FIG. 1 along their respective antennas.

Turning now to a prior art open loop transmit diversity system, it may described generally and in comparison to the closed loop system 10 of FIG. 1, where the primary distinction is that the prior art open loop transmit diversity system does not require feedback. Thus, to depict an open loop system the illustration of FIG. 1 may be modified by removing the feedback channel, weights $W_1$ and $W_2$ and multipliers $\mathbf{20}_1$ and $\mathbf{20}_2$, with the remaining blocks thereby generally illustrating an open loop transmit diversity system. Given that the open loop transmit diversity system does not include feedback, it instead employs an alternative technique to adjust data differently for each of its transmit antennas. Therefore, the open loop system receiver then attempts to properly evaluate the data in view of the known transmitter adjustment. Thus, the processing and algorithms implemented within the receiver decoder of an open loop system will differ from those in a closed loop system.

To further depict open loop transmit diversity, FIG. 2 illustrates, by way of example, a prior art open loop transmitter 30 that is referred to as providing space time block coded transmit antenna diversity ("STTD"), and further in this regard transmitter 30 includes an STTD encoder 32. STTD encoder 32 has an input 34, which by way of example is shown to receive a first symbol $S_1$ at a time T followed by a second symbol $S_2$ at a time 2T. For the sake of the present example, assume that symbols $S_1$ and $S_2$ are QPSK symbols. STTD encoder 32 has two outputs $\mathbf{36}_1$ and $\mathbf{36}_2$, each connected to a respective antenna $A\mathbf{32}_1$ and $A\mathbf{32}_2$.

The operation of transmitter 30 is now explored, and recall in general from above that open loop system transmitters adjust data differently at each transmit antenna without the assistance of feedback. In the case of transmitter 30, STTD encoder 32 first buffers a number of symbols equal to the number of transmit antennas. In the example of FIG. 2 which has two transmit antennas $A\mathbf{32}_1$ and $A\mathbf{32}_2$, STTD encoder 32 therefore buffers two symbols (e.g., $S_1$ and $S_2$). Next, STTD encoder 32 directly transmits the buffered symbols along antenna $A\mathbf{32}_1$ and, thus, in FIG. 2 symbol $S_1$ is transmitted at a time T' and symbol $S_2$ is transmitted at a time 2T'. During the same time, however, and for transmission along antenna $A\mathbf{32}_2$, the complex conjugates of the symbols are formed and reversed in order. For the example of FIG. 2, therefore, these two operations create, in the reversed order, a sequence of $S^*_2$ and $S^*_1$. Moreover, when transmitted along antenna $A\mathbf{32}_2$, the negative value of the first of these two symbols is transmitted while the positive value of the second symbol is transmitted. Accordingly, in FIG. 2 and with respect to antenna $A\mathbf{32}_2$, a symbol $-S^*_2$ is transmitted at a time T' and a symbol $S^*_1$ is transmitted at a time 2T'. From the symbols transmitted by STTD encoder 32, a compatible receiver is therefore able to resolve the symbols in a manner that often yields favorable data error rates even given relatively large Doppler rates. Finally, note also by way of an alternative example that if symbols $S_1$ and $S_2$ were BPSK symbols, then such symbols would include only real components (i.e., they do not include a complex component). In this case, along antenna $A\mathbf{32}_1$ system 30 would transmit symbol $S_1$ at time T' and symbol $S_2$ at time 2T', while along antenna $A\mathbf{32}_2$ system 30 would transmit symbol $S_2$ at time T' and symbol $-S_1$ at time 2T'.

Having detailed both closed loop and open loop transmit antenna diversity systems, additional observations are now made regarding the benefits and drawbacks of each. In general, under the ideal situation, a closed loop system outperforms an open loop system for a given transmitted signal power. However, due to non-ideal occurrences in the feedback information, a closed loop system may be inferior to an open loop system in some situations. For example, as Doppler fading increases, by the time the feedback information is received by the transmitter, the weights included or derived from the feedback information may be relatively outdated and therefore less effective when applied to future transmissions by the transmitter. Conversely, because the open loop system does not implement feedback from the receiver to the transmitter, then such a system may provide greater performance in a high Doppler environment. In the prior art, the drawbacks of both the closed loop and open loop systems have been addressed in one manner by further increasing the number of antennas in either the closed loop or open loop system. While this approach may improve error rates as compared to fewer antennas for the same system, there are diminishing returns in data error rates to be considered versus the complexities of adding more antennas to a system. Moreover, for each antenna added to a closed loop diversity system, there is a corresponding increase in the amount of bandwidth required to accommodate the additional feedback information required for the added transmit antenna.

In view of the above, there arises a need to improve upon the drawbacks of prior art closed loop systems and prior art open loop Systems, and such a need is addressed by the preferred embodiments described below.

BRIEF SUMMARY OF THE INVENTION

In the preferred embodiment, there is a wireless communication system. The system comprises transmitter circuitry comprising encoder circuitry for receiving a plurality of symbols. The system further comprises a plurality of antennas coupled to the transmitter circuitry and for transmitting signals from the transmitter circuitry to a receiver, wherein the signals are responsive to the plurality of symbols. Further, the encoder circuitry is for applying open loop diversity and closed loop diversity to the plurality of symbols to form the signals. Other circuits, systems, and methods are also disclosed and claimed.

DETAILED DESCRIPTION OF THE INVENTION

Figure 1:
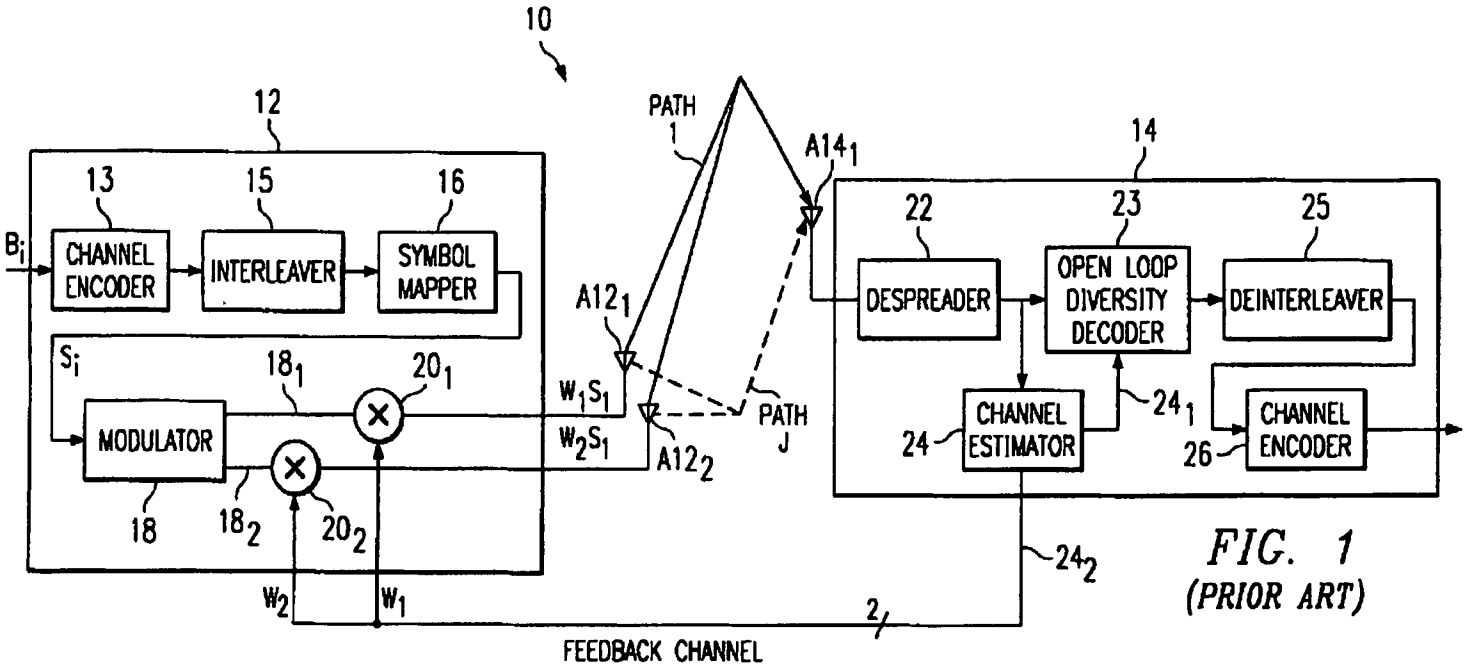
FIG. 1 (PRIOR ART)
FIG. 1 illustrates an electrical diagram of a prior art closed loop transmit antenna diversity system.
Figure 2:
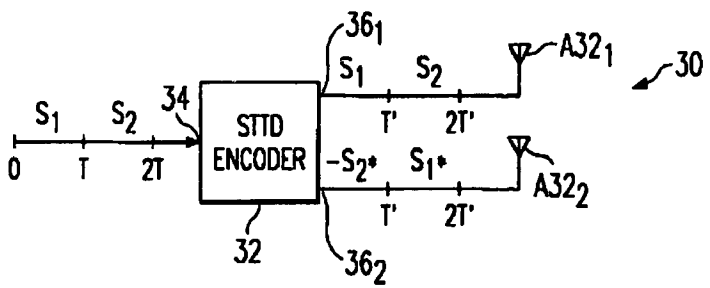
FIG. 2 (PRIOR ART)
FIG. 2 illustrates an electrical diagram of a transmitter in a prior art open loop transmit antenna diversity system.

FIGS. 1 and 2 were described above in the Background Of The Invention section of this document and the reader is assumed to be familiar with the details described in that section.

Figure 3:
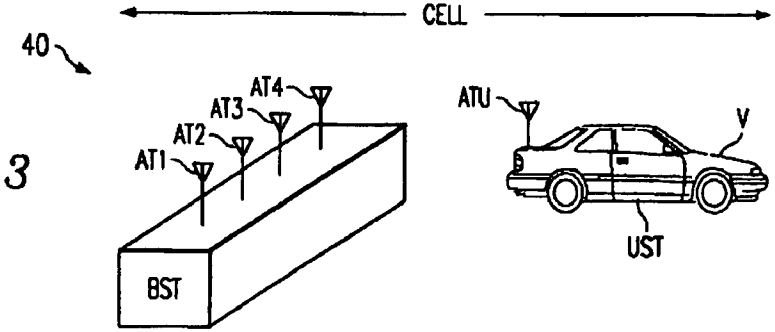
FIG. 3 illustrates a diagram of a cellular communications system by way of a contemporary example in which the preferred embodiments operate.

FIG. 3 illustrates a diagram of a cellular cunitions system 40 by way of a contemporary example in which the preferred embodiments operate. Within system 40 is shown a base station BST, which includes four antennas AT1 through AT4 along which base station BST may transmit (or receive) CDMA or WCDMA signals. In the preferred embodiment, each antenna in the group of antennas AT1 through AT4 is within approximately three to four meters of another antenna in the group. In other embodiments, however, note that the multiple transmit antennas may be much closer to one another; for example, in an environment where base station BST and user station UST are both indoor stations, the distance between the multiple transmit antennas of base station BST may be on the order of inches. Returning to the example of FIG. 1, the general area of intended reach of base station BST defines a corresponding CELL and, thus, base station BST is intended to generally communicate with other cellular devices within that CELL. Beyond the CELL there may be other cells, each having its own corresponding base station, and indeed there may be some overlap between the illustrated CELL and one ore more other cells adjacent the illustrated CELL. Such overlap is likely to support continuous communications should a mobile communication station move from one cell to another. Further in this regard, system 40 also includes a user station UST, which is shown in connection with a vehicle V to demonstrate that user station UST is mobile. By way of example, user station UST includes a single antenna ATU for both transmitting and receiving cellular communications.

In various respects, system 40 may operate according to known general techniques for various types of cellular or other spread spectrum communications, including CDMA or WCDMA communications. Such general techniques are known in the art and include the commencement of a call from user station UST and the handling of that call by base station BST. Where system 40 differs from the prior art, however, is the system for, and method of, communicating signals from each of the four antennas AT1 through AT4 to user station UST. These distinctions are further detailed below in connection with FIG. 4.

Figure 4:
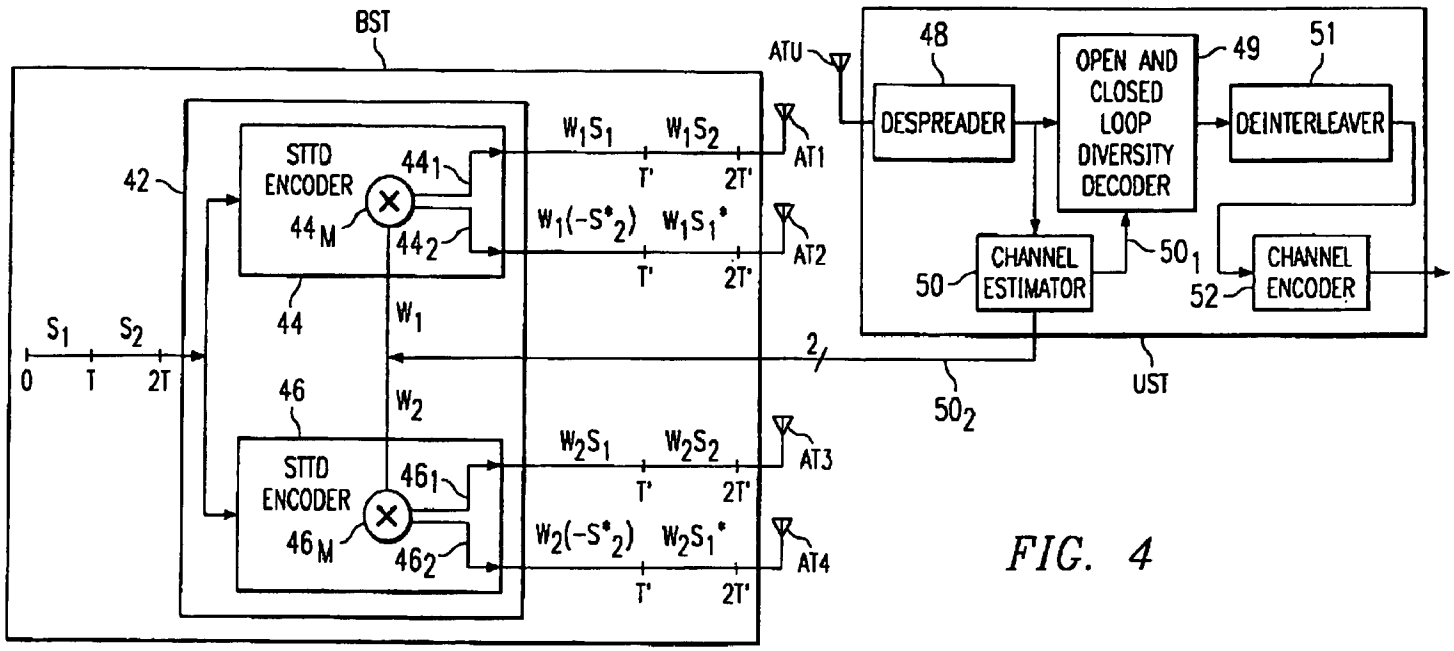
FIG. 4 illustrates an electrical diagram of the preferred base station transmitter and mobile station receiver of FIG. 3.

FIG. 4 illustrates an electrical block diagram of base station BST and user station UST from system 40 of FIG. 3. For the sake of discussion, each of base station BST and user station UST is separately detailed below. By way of introduction, however, one skilled in the art will appreciate from the following details that system 40 presents a transmitter with more than two antennas (e.g., four in FIG. 4), where its signals are communicated using a combination of open loop and closed loop communication techniques.

Looking to base station BST in FIG. 4, it includes a transmitter 42 which further includes two separate STTD encoders 44 and 46, both of which receive the same stream of symbols. By way of example, two input symbols are shown, a symbol $S_1$ at a time T and a symbol $S_2$ and a time 2T. Symbols $S_1$ and $S_2$ may be provided by other circuitry (not shown) within base station BST that is either part of transmitter 42 or external from it, and such other circuitry may be appreciated by way of example with reference to the circuitry preceding modulator 18 in FIG. 1. Returning to STUD encoder 44, it has outputs $\mathbf{44}_1$ and $\mathbf{44}_2$ connected to respective antennas AT1 and AT2. STTD encoder 46 has outputs 46, and $\mathbf{46}_2$ connected to respective antennas AT3 and AT4.

The operation of transmitter 42 is as follows. First, recall it is noted above that system 40 combines open loop and closed loop communication techniques. In the embodiment of FIG. 4 and as now presented in detail, this combination is achieved by implementing an open loop communication technique per STTD encoder and by implementing a closed loop communication technique as between one STTD encoder versus another STUD encoder. As another manner of stating the combination and as further appreciated below, system 40 implements an open loop communication technique for a first and second pair of its transmit antennas, and it further implements a closed loop diversity communication technique as between the first transmit antenna pair relative to the second transmit antenna pair. Each of these different techniques, and their combination, is discussed below.

The open loop communication aspect of transmitter 42 may be appreciated by way of example with respect to STUD encoder 44, and note that the signals output by STTD encoder 44 to antennas AT1 and AT2 are shown in FIG. 4; from these signals, it may be appreciated that all of the signals have a common factor of a weight, $W_1$, which is further appreciated from the later discussion of the closed loop technique and which for the immediately following discussion is ignored so as to appreciate the open loop technique. Looking now to the factors other than the weight, $W_1$, in the output signals of STUD encoder 44, one skilled in the art will appreciate that such signals alone represent an open loop diversity communication technique. Specifically, STTD encoder 44 first buffers a number of symbols equal to the number of transmit antennas to which it is connected, which is two antennas (i.e., AT1 and AT2) in the present example. Thus, STTD encoder 44 buffers symbols $S_1$ and $S_2$. Next, STUD encoder 44 directly transmits the buffered symbols $S_1$ and $S_2$ along antenna AT1 and, thus, in FIG. 4 symbol $S_1$ is transmitted at a time T' and symbol $S_2$ is transmitted at a time 2T'. During the same time, and for transmission along antenna AT2, the complex conjugate of the symbols are formed and reversed in order, and after the reversal the negative value of the first symbol conjugate is communicated (i.e., $-S^*_2$) at time T' followed by the positive value of the second symbol conjugate (i.e., $S^*_1$) at time 2T'. Given the preceding with respect to the pair of antennas AT1 and AT2, it should be appreciated that system 40 implements an open loop communication technique relative to that transmit antenna pair.

The open loop diversity communication technique of system 40 may be appreciated further with reference to the pair of transmit antennas AT3 and AT4 and STTD encoder 46 which outputs signals to those antennas. Looking to the signals output along antennas AT3 and AT4, they each have a common factor of a weight, $W_2$. Looking to the factors other than the weight, $W_2$, in the output signals of STTD encoder 46, such signals alone also represent an open loop diversity communication technique. Specifically, STTD encoder 46 also buffers symbols $S_1$ and $S_2$ and transmits them in the same manner as STTD encoder 44 described above. Thus, STTD encoder 46 directly transmits symbols $S_1$ and $S_2$ along antenna AT3 (at time T' and 2T, respectively) and STTD 46 encoder at the same time transmits $-S^*_2$, the negative symbol conjugate of the second symbol, at time T' followed by $S^*_1$, the positive symbol conjugate of the first symbol, at time 2T'. These communications further demonstrate that system 40 implements an open loop communication technique relative to the pair of transmit antennas AT3 and AT4.

The closed loop diversity communication aspect of transmitter 42 may be appreciated by examining the differences in the output signals of STTD encoders 44 and 46, and further in view of user station UST. Looking first to user station UST, it includes a despreader 48, an open and closed loop diversity decoder 49, a channel estimator 50, a deinterleaver 51, and a channel decoder 52. Each of these devices may be constructed and operate according to techniques in various respects ascertainable by one skilled in the art and in view of the earlier discussion relative to FIG. 1; further, however, recall that system 40 communicates signals using a combination of open loop and closed loop communication techniques. Thus, decoder 49 should be constructed to perform both open loop and closed loop diversity decoding, and preferably these operations should be simultaneous with respect to both diversity types since those diversity types are both combined into the signals received by receiver UST, as will be appreciated further in view of the combined open and closed loop transmit antenna diversity techniques described in this document. At the present point in this discussion, note that channel estimator 50 determines estimated channel impulse responses based on the incoming despread data as further detailed below, and in addition to providing the estimates to decoder 49 via an output $\mathbf{50}_1$, it also provides via an output $\mathbf{50}_2$ the estimates, or values derived from those estimates, back to base station BST via a feedback channel. These feedback values are shown in FIG. 4 as weights $W_1$ and $W_2$ and may be returned individually or as a ratio (e.g., $W_2/W_1$). Returning now to transmitter 42 of base station BST, its use of weights $W_1$ and $W_2$ to implement its closed loop aspect now may be appreciated. Specifically, weight $W_1$ is coupled to a mutliplier $\mathbf{44}_M$ associated with or as part of STTD encoder 44, and as a result weight $W_1$ is multiplied times each symbol to be output by STTD encoder 44. Accordingly, the factor of $W_1$ may be seen in FIG. 4 in each of the output signals from STTD encoder 44 (i.e., as transmitted by antennas AT1 and AT2). Similarly, weight $W_2$ is coupled to a mutliplier $\mathbf{46}_M$ associated with or as part of STTD encoder 46, and as a result weight $W_2$ is multiplied times each symbol to be output by STTD encoder 46. Accordingly, the factor of $W_2$ may be seen in FIG. 4 in each of the output signals from STTD encoder 46 (i.e., as transmitted by antennas AT3 and AT4). Thus, different weights are included within different output signals of base station BST and those weights are in response to the feedback channel from user station UST. Accordingly, the use of the different weights by system 40 demonstrates a closed loop communication technique as between one pair of transmit antennas (e.g., AT1 and AT2) relative to another pair of transmit antennas (e.g., AT3 and AT4).

Having demonstrated the use of weights $W_1$ and $W_2$ in the closed loop aspect of system 40, attention is now directed to the generation of the optimum value for those weights by channel estimator 50. Specifically, these weights are calculated as follows. First, the following Equation 1 defines a matrix, $\overline{W}$, for further generation of the weights $W_1$ and $W_2$:

$$\overline{W} = \begin{bmatrix} W_1 \\ W_2 \end{bmatrix} \qquad \text{Equation 1}$$

Next, the following Equations 2 and 3 define channel impulse response matrices for each of antennas AT1 through AT4 in system 40, where $h_i$ is the channel impulse response matrix for antenna AT1 in system 40.

$$H_1=[h_1 h_3] \qquad \text{Equation 2}$$

$$H_2=[h_2 h_4] \qquad \text{Equation 3}$$

For each of Equations 2 and 3, if there are a total of N resolvable multipaths from base station BST to user station UST, then $h_i$ is further defined as a vector relating to each of those multipaths as shown in the following Equation 4:

$$h_i = \begin{bmatrix} \alpha_i^1 \\ \alpha_i^2 \\ \\ \alpha_i^N \end{bmatrix} \qquad \text{Equation 4}$$

Next, a term $r_1$ is defined in Equation 5 and is the signal received by user station UST after despreading the signal transmitted over time [0, T) and taking into account a noise-factor, $n_1$:

$$r_1=h_1W_1S_1-h_2W_1S^*_2+h_3W_2S_1-h_4W_2S^*_2+n_1 \qquad \text{Equation 5}$$

Similarly, a term $r_2$ is defined in Equation 6 and is the signal received by user station UST after despreading the signal transmitted over time [T, 2T), and taking into account a noise factor, $n_2$:

$$r_2=h_1W_1S_2+h_2W_1S^*_1+h_3W_2S_2+h_4W_2S^*_1+n_2 \qquad \text{Equation 6}$$

Rearranging the preceding yields Equation 7 for the value $r_1$:

$$r_1=(h_1W_1+h_3W_2)S_1-(h_2W_1+h_4W_2)S^*_2+n_1=H_1\overline{W}S_1-H_2WS_2+n_1 \qquad \text{Equation 7}$$

Rearranging the preceding yields Equation 8 for the value $r_2$:

$$r_2=(h_2W_1+h_4W_2)S^*_1+(h_1W_1+h_3W_2)S_2+n_2=H_2\overline{W}S^*_1+H_1WS^*_2+n_2 \qquad \text{Equation 8}$$

When signals $r_1$ and $r_2$ reach decoder 52, they are decoded as known in the STFD art. This decoding therefore may be represented as in the following Equation 9, and using the conventions that the symbol $(.)^H$ denotes conjugate transpose of a vector, the symbol $(.)^T$ denotes a transpose of a vector, and the symbol (.)* denotes its conjugate:

$$\overline{W}^H H_1^H r_1 + \overline{W}^T H_2^T r_2^* = (\overline{W}^H H_1^H H_1 \overline{W})S_1 + (\overline{W}^T H_2^T H_2^* \overline{W}^*)S_1 + W^H H_1^H n_1 + \overline{W}^T H_2^T n_2^* \quad \text{Equation 9}$$

Since $\overline{W}^T H_2{}^T H^*{}_2 \overline{W}^*$ is a real number, the the following Equation 10 properties hold:

$$\overline{W}^T H_2{}^T H^*{}_2 \overline{W}^* = (\overline{W}^T H_2{}^T H^*{}_2 \overline{W}^*)^* = \overline{W}^H H_2{}^H H_2 \overline{W} \quad \text{Equation 10}$$

Equation 10 then implies the following Equation 11:

$$\overline{W}^H H_1{}^H r_1 + \overline{W}^T H_2{}^T r^*{}_2 = (\overline{W}^H (H_1{}^H H_1 + H_2{}^H H_2)\overline{W})S_1 + \overline{W}^H H_1{}^H n_1 + \overline{W}^T H_2{}^T n^*{}_2 \quad \text{Equation 11}$$

Similarly, therefore:

$$-\overline{W}^T H_2{}^T r^*{}_1 + \overline{W}^H H_1{}^H r_2 = (\overline{W}^H (H_1{}^H H_1 + H_2{}^H H_2)\overline{W})S_2 - \overline{W}^T H_2{}^T n^*{}_1 + \overline{W}^H H_1{}^H n_s \quad \text{Equation 12}$$

The signal to noise ratio for symbol $S_1$ is now given by Equation 13:

$$\mathrm{SNR}(S_1) = \frac{(\overline{W}^H (H_1^H H_1 + H_2^H H_2)\overline{W})^2}{E[(\overline{W}^H H_1^H n_1 + \overline{W}^T H_2^T n_2^*)(\overline{W}^H H_1^H n_1 + \overline{W}^T H_2^T n_2^*)^*]} = \frac{(\overline{W}^H (H_1^H H_1 + H_2^H H_2)\overline{W})}{\sigma^2} \quad \text{Equation 13}$$

where $\sigma^2 = E[n_1{}^H n_1] = E[n_2{}^H n_2]$ is the variance of the noise.

Similarly the SNR for symbol $S_2$ is given by Equation 14:

$$\mathrm{SNR}(S_2) = \frac{(\overline{W}^H (H_1^H H_1 + H_2^H H_2)\overline{W})}{\sigma^2} \quad \text{Equation 14}$$

Maximization of Equations 13 and 14 with respect to the weight vector implies the calculation of the eigen vectors for the matrix $(H_1{}^H H_1 + H_2{}^H H^2)$. Let $V_1, V_2$ indicate the two eigen vectors and $\mu_1$, $\mu_2$ be the two corresponding eigen values. User station UST picks the eigen vector with the maximum eigen value implying that:

$$\mu_1 > \mu_2 \Rightarrow \overline{W} = V_1$$

$$\mu_2 > \mu_1 \Rightarrow \overline{W} = V_2 \quad \text{Equation 15}$$

User station UST then sends back the weight values $W_1$ and $W_2$ back to base station BST. Normalizing the weight $W_1 = 1$, user station UST can optionally send back only the ratio $(W_2/W_1)$ to base station BST and base station BST then sets the weights on the antennas accordingly.

To further illustrate Equations 1 through 15 for simplicity, assume that there is only one multipath from base station BST to user station UST implying that N=1. Given this assumption, then user station UST receives the following two symbols shown in Equations 16 and 17 after despreading:

$$r^1 = W_1(\alpha_1^1 S_1 - \alpha_2^1 S_2^*) + W_2(\alpha_3^1 S_1 - \alpha_4^1 S_2^*) + N_2 \quad \text{Equaion 16}$$

$$r^2 = W_1(\alpha_1^1 S_2 + \alpha_2^1 S_1^*) + W_2(\alpha_3^1 S_2 + \alpha_4^1 S_1^*) + N_1 \quad \text{Equaion 17}$$

where $N_1$ and $N_2$ are additive white Guassian noise.

Rearranging Equations 16 and 17 yields the following Equations 18 and 19, respectively:

$$r^1 = S_1(W_1\alpha_1^1 + W_2\alpha_3^1) - S_2^*(W_1\alpha_2^1 + W_2\alpha_4^1) + N_2 \quad \text{Equaion 18}$$

$$r^2 = S_2(W_1\alpha_1^1 + W_2\alpha_3^1) + S_1^*(W_1\alpha_2^1 + W_2\alpha_4^1) + N_1 \quad \text{Equaion 19}$$

For subsituting into Equations 18 and 19, and letting $$\tilde{\alpha} = (W_1\alpha_1^1 + W_2\alpha_3^1),\ \tilde{\beta} = (W_1\alpha_2^1 + W_2\alpha_4^1),$$

then one skilled in the art will appreciate that Equations 18 and 19 are in the form of standard STTD implying that the total SNR for each symbol $S_1$ and $S_2$ after STTD decoding will be as shown in the following Equation 20:

$$\frac{|(W_1\alpha_1^1 + W_2\alpha_3^1)|^2 + |(W_1\alpha_2^1 + W_2\alpha_4^1)|^2}{\sigma^2} \quad \text{Equation 20}$$

Having detailed system 40, various of its advantages now may be observed. For example, system 40 achieves a 2N path diversity where N is the number of paths from base station BST to user station UST. As another example, versus an open loop approach alone, there is an increase of a 3 dB gain in average SNR due to the use of closed loop transmit diversity across the two antenna groups (i.e., AT1 and AT2 versus AT3 and AT4). As still another example, the required reverse link bandwidth for providing the $W_1$ and $W_2$ feedback information is that corresponding to only two antennas while system 40 is supporting four transmit antennas. As a final example, the processing operations for receiving data by user station UST may be implemented using standard STTD decoding for each of the symbols $S_1$, $S_2$. From each of the preceding advantages, one skilled in the art should appreciate that the preferred embodiment achieves better performance with a lesser amount of complexity than is required in a prior art approach that increases the number of transmit antennas for a given (i.e., either closed or open) diversity scheme. As yet another advantage of the preferred embodiments, while such embodiments have been described in detail, various substitutions, modifications or alterations could be made to the descriptions set forth above without departing from the inventive scope. To further appreciate this inventive flexibility, various examples of additional changes contemplated within the preferred embodiments are explored below.

While the example of system 40 has demonstrated the use of four transmit antennas, the inventive implementation of system 40 also may be applied to wireless systems with other numbers of antennas, again using a combination of open loop transmit diversity and closed loop transmit diversity as between subsets of the entire number of transmit antennas. For example, one alternative embodiment contemplated includes six transmit antennas, which for the sake of discussion let such antennas be referred to as AT10 through AT15. With this system, open loop transmit diversity may applied to pairs of those antennas, as with a first antenna pair AT10 and AT11, a second antenna pair AT12 and AT13, and a third antenna pair AT14 and AT15. Further, closed loop transmit diversity may then be applied between each of those pairs of antennas, whereby a first weight is applied to signals transmitted by the first antenna pair, a second weight is applied to signals transmitted by the second antenna pair, and a third weight is applied to signals transmitted by the third antenna pair. As another example, a combination of open loop transmit diversity and closed loop transmit diversity may be applied to a transmitter with eight antennas. In this case, however, various additional alternatives exist. For example, the eight antennas may be split into four pairs of antennas, where open loop transmit diversity is applied within each pair of antennas, and closed loop transmit diversity is applied as between each antenna pair (i.e., four different weights, one for each antenna pair). Alternatively, the eight antennas may be split into two sets of four antennas each, where open loop transmit diversity is applied within each set of four antennas, and closed loop transmit diversity is applied as between the sets (i.e., two different weights, one for each set of four antennas).

Figure 5:
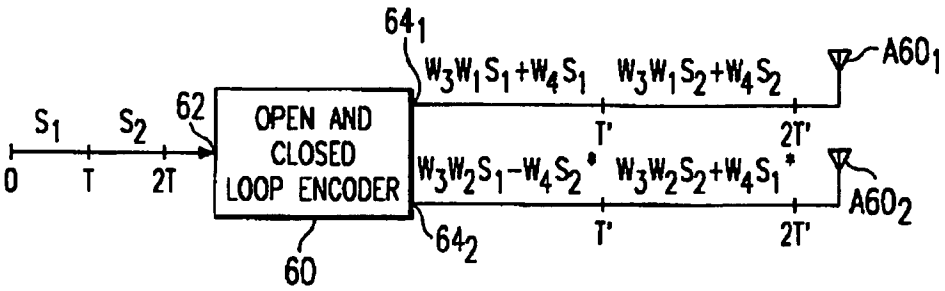
FIG. 5 illustrates an open and closed loop encoder for transmitting along two antennas.

Also while the previous examples have demonstrated more than two transmit antennas, it is recognized in connection with the present inventive aspects that a combination of open loop transmit diversity and closed loop transmit diversity may prove worthwhile for a transmitter with only two transmit antennas. Specifically, instances may arise where a transmitter in a closed loop diversity system receives feedback from a receiver to develop weights for future transmissions, but due to some factor (e.g., high Doppler) the transmitter is informed of some reduced amount of confidence in the weights; for such an application, therefore, an alternative of the preferred embodiment may be created by adding an open loop diversity technique to the closed-loop transmissions, thereby creating a combined diversity system. FIG. 5 illustrates an example of such an application, and is now explored in greater detail.

FIG. 5 illustrates an open and closed loop encoder 60, and which may be included within a transmitter such as transmitter 42 described above in connection with FIG. 4. Encoder 60 has an input 62, which by way of example is shown to receive a first symbol $S_1$ at a time T followed by a second symbol $S_2$ at a time 2T, and again assume by way of example that symbols $S_1$ and $S_2$ are QPSK symbols. STTD encoder 32 has two outputs $\mathbf{64}_1$ and $\mathbf{64}_2$, each connected to a respective antenna $A\mathbf{60}_1$ and $A\mathbf{60}_2$.

The operation of encoder 60 may be understood in view of the principles discussed above, and further in view of the signals shown as output to antennas $A\mathbf{60}_1$ and $A\mathbf{60}_2$. For example, at time T', antenna $A\mathbf{60}_1$ outputs a combined signal formed by two addends, $W_3W_1S_1+W_4S_1$, while at the same time T' antenna $A\mathbf{60}_2$ outputs a combined signal formed by two addends, $W_3W_2S_1-W_4S_2^*$. The notion of combining an open and closed loop diversity may be appreciated from these combined signals by looking at the addends in each signal; specifically, as shown below, encoder 60 operates so that for each signal transmitted it includes two addends, where the second-listed addend has a closed loop diversity and the first-listed addend has an open loop diversity. Each of the diversity types is separately discussed below.

To appreciate the open loop addends communicated by encoder 60, assume that $W_3=0$ in which case the signals communicated by antennas $A\mathbf{60}_1$ and $A\mathbf{60}_2$ at time T' reduce to the second-listed addends of the combined signals shown above. Specifically, for $W_3=0$, the signals output at time T' by encoder 60 reduce to an output of $W_4S_1$ by antenna $A\mathbf{60}_1$ and an output of $-W_4S_2^*$ by antenna $A\mathbf{60}_2$. By removing the common factor of $W_4$ from these two addends, one skilled in the art will appreciate that the remaining factors (i.e., $S_1$ for antenna $A\mathbf{60}_1$ and $-S_2^*$ for antenna $A\mathbf{60}_2$) have an open loop diversity with respect to one another. This same observation with respect to open loop diversity may be found at time 2T'. Specifically, if $W_3=0$, then the signals output at time 2T' by encoder 60 reduce to an output of $W_4S_2$ by antenna $A\mathbf{60}_1$ and an output of $W_4S_1^*$ by antenna $A\mathbf{60}_2$. By removing the common factor of $W_4$ from these two addends, one skilled in the art will appreciate that the remaining factors (i.e., $S_2$ for antenna $A\mathbf{60}_1$ and $S_1^*$ for antenna $A\mathbf{60}_2$) have an open loop diversity with respect to one another.

To appreciate the closed loop addends communicated by encoder 60, assume that $W_4=0$ in which case the signals communicated by antennas $A\mathbf{60}_1$ and $A\mathbf{60}_2$ at time T' reduce to the first-listed addends of the combined signals shown above. Thus, for $W_4=0$, the signals output at time T' by encoder 60 reduce to an output of $W_3W_1S_1$ by antenna $A\mathbf{60}_1$ and an output of $W_3W_2S_1$ by antenna $A\mathbf{60}_2$. By removing the common factor of $W_3$ from these two addends, one skilled in the art will appreciate that the remaining factors (i.e., $W_1S_1$ for antenna $A\mathbf{60}_1$ and $W_2S_1$ for antenna $A\mathbf{60}_2$) have a closed loop diversity with respect to one another inasmuch as they represent a product involving the same symbol but with a different weight multiplied times each symbol. This same observation with respect to closed loop diversity may be found at time 2T. Specifically, if $W_4=0$, then the signals output at time 2T' by encoder 60 reduce to $W_3W_1S_2$ by antenna $A\mathbf{60}_1$ and an output of $W_3W_2S_2$ by antenna $A\mathbf{60}_2$. Once more, by removing the common factor of $W_3$ from these two addends, one skilled in the art will appreciate that the remaining factors (i.e., $W_1S_2$ for antenna $A\mathbf{60}_1$ and $W_2S_2$ for antenna $A\mathbf{60}_2$) have an open loop diversity with respect to one another.

Concluding the discussion of FIG. 5, it may be observed that encoder 60 again supports a transmitter with two sets of transmit antennas, where in this case each set consists of a single antenna rather than multiple antennas as in the previously-described embodiments. Nonetheless, the transmitter receives feedback from its receiver in order to implement closed loop diversity by applying different weights to some of the symbols to form signals for communication by the transmitter (via its encoder) while other of the signals communicated by the transmitter result from symbols selectively modified according to an open loop diversity technique.

Figure 6:
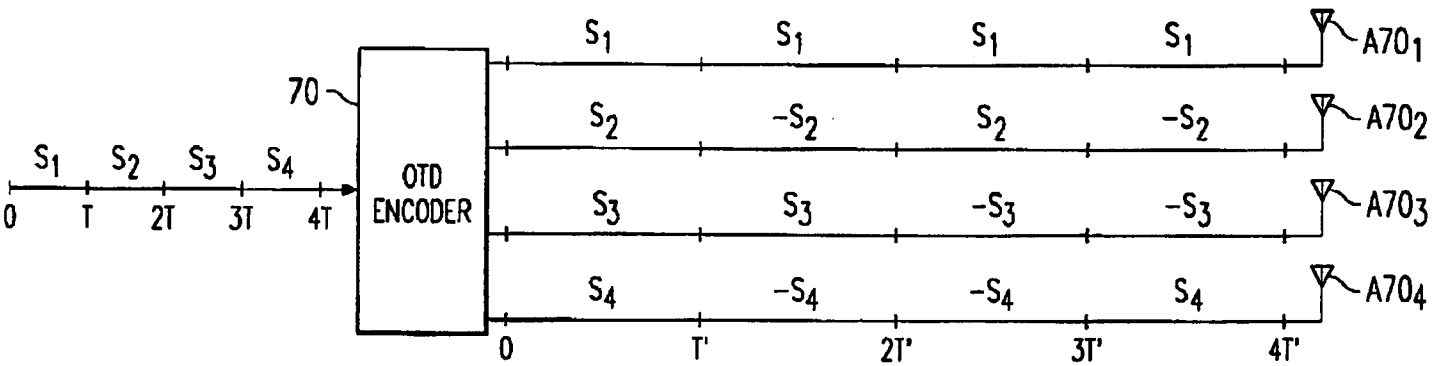
FIG. 6 illustrates an OTD encoder for transmitting open loop diverse signals along four antennas.
Figure 7:
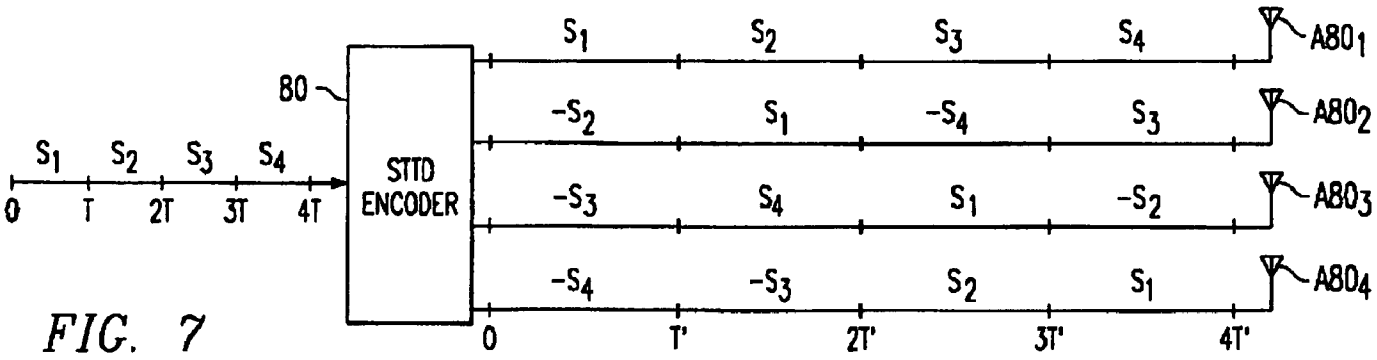
FIG. 7 illustrates a space time block coded transmit antenna diversity encoder for transmitting open loop diverse signals along four antennas.
Figure 8:
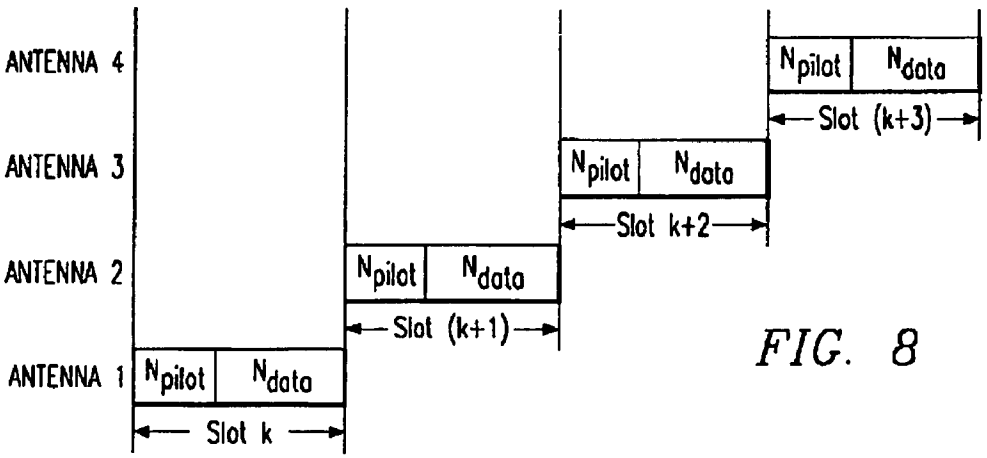
FIG. 8 illustrates a time switched time diversity encoder for transmitting open loop diverse signals along four antennas.

As still another example of the present inventive scope, the types of open loop and closed loop transmit diversity also may be changed as applied to the preferred embodiments. Thus, while TxAA has been shown above as a closed loop technique, and STTD has been shown as an open loop technique, one or both of these may be replaced by corresponding alternative techniques and applied to a multiple transmit antenna system, thereby again providing a combined closed loop and open loop transmit antenna system. Indeed, recall above an example is set forth for an inventive system having eight antennas split into sets of four antennas, where open loop transit diversity is applied within each set of four antennas. In this case, the application of open loop transmit diversity as applied within a set of four antennas will require a type of open loop diversity other than solely the transmission of conjugates; in other words, a use only of conjugates provides two different signals, whereas for four different antennas a corresponding four different signals are required to achieved the open loop diversity. Accordingly, for this as well as other embodiments, a different open loop diversity approach may be implemented. For example, another open loop diversity technique that may be implemented according to the preferred embodiment includes orthogonal transmit diversity ("OTD"), and which is shown for a single OTD encoder 70 in FIG. 6 and for BPSK symbols. In FIG. 6, OTD encoder 70 is coupled to transmit symbols to four antennas $A\mathbf{70}_1$ through $A\mathbf{70}_4$. Further, in operation, OTD encoder 70 buffers a number of symbols equal to its number of antennas (i.e., four in the example of FIG. 6), and then each antenna transmits only one corresponding symbol and that is in a form that is orthogonal to all other symbols transmitted along the other antennas. These forms are shown by way of the output symbols in FIG. 6 along antas A70$_1$ through A70$_4$ from time T' through time 4T. Further, for simplicity FIG. 6 only illustrates the OTD operation and, thus, does not further show the use of weighting to achieve the combined closed loop diversity. Nonetheless, the addition of a closed loop weighting operation should be readily implemented by one skilled in the art given the preceding teachings with respect to other embodiments. As another example of an alternative open loop diversity that may be used according to the preferred embodiments, FIG. 7 illustrates an STTD encoder 80 for four antennas A80$_1$ through A80$_4$. The conventions of FIG. 7 should be readily appreciated from the preceding examples, where the signals transmitted along antennas A80$_1$ through A80$_4$ therefore represent open loop diverse signals, and for the example where the symbols are BPSK symbols. Also as in the case of FIG. 6, for simplicity FIG. 7 only illustrates the open loop diversity operation (i.e., STTD) and, thus, FIG. 7 does not furhter show the use of weighting to achieve the combined closed loop diversity, where such additional weighting may be implemented by one skilled in the art according to the teachings of this document. As still another example of an alternative open loop diversity that may be used according to the preferred embodiments, FIG. 8 illustrates time switched time diversity ("TSTD") for four antennas. Lastly, other closed loop diversity techniques that may be used to create still further alternative embodiments include switched diversity.

As still another example of the inventive scope, note that various of such teachings may be applied to other wireless systems. For example, the preceding may be applied to systems complying with the 3$^{rd}$ Generation partnership Project ("3GPPP") for wireless communications, and to 3GPPP 2 systems, as well as still other standardized or non-standardized systems. Further, while the preceding example has been shown in a CDMA system (or a WCDMA system), the preferred embodiment may be implemented by including transmitter antenna diversity combining both open loop and closed loop diversity in a time division multiple access ("TDMA") system, which has a spreading gain of one.

As a final example of the inventive scope, while the preceding embodiments have been shown in connection with a receiver having only a single antenna, note that systems using multiple receive antennas also are contemplated. In other words, therefore, the preceding also may be combined with various techniques of receive antenna diversity.

From the preceding, one skilled in the art should appreciate various aspects of the inventive scope, as is defined by the following claims.

What is claimed is:

1. A wireless communication system, comprising:

transmitter circuitry comprising encoder circuitry for receiving a plurality of symbols;

a plurality of antennas coupled to the transmitter circuitry and for transmitting signals from the transmitter circuitry to a receiver, wherein the signals are responsive to the plurality of symbols; and wherein the encoder circuitry is for applying space time block coded transmit antenna open loop diversity and closed loop diversity to the plurality of symbols to form the signals;

wherein the plurality of antennas comprises a [pluraltty] *plurality* of sets of antennas;

wherein for each of the sets of antennas the encoder circuitry is for applying space [tile] *time* block coded transmit antenna diversity to selected ones of the plurality of symbols such that signals transmitted by any one antenna in the set of antennas represent open loop diversity with respect to signals transmitted by any other antenna in the set of antennas; and wherein for each of the sets of antennas the encoder circuitry is for applying a weight to the plurality of symbols such that signals fitted in response to the weight represent a closed loop diversity with respect to signals transmitted by any other antenna in any other of the sets of antennas.

2. The system of claim 1:

wherein the plurality of sets of antennas consists of two sets of antennas; and wherein each of the sets of antennas consists of two antennas.

3. The system of claim 1:

wherein the plurality of sets of antennas consists of three sets of antennas; and wherein each of the sets of antennas consists of two antennas.

4. The system of claim 1:

wherein the plurality of sets of antennas consists of two sets of antenas; and wherein each of the sets of antennas consists of four antennas.

5. The system of claim 1:

wherein the plurality of sets of antennas consists of four sets of antennas; and wherein each of the sets of antennas consists of two antennas.

6. The system of claim 1 wherein the closed loop diversity comprises transmit adaptive array diversity.

7. The system of claim 1 and further comprising the receiver.

8. The system of claim 7 wherein the receiver comprises one antenna for receiving the signals transmitted from the plurality of antennas.

9. The system of claim 7 wherein the receiver comprises a plurality of antennas, wherein each of the plurality of antennas is for receiving the signals transmitted from the plurality of antennas.

10. The system of claim 7 wherein the receiver comprises decoder circuitry for decoding open loop diversity and closed loop diversity with respect to the plurality of symbols.

11. The system of claim 10 wherein the receiver further comprises:

a despreader having an output and for producing a despread symbol stream at the output in response to the signals, wherein the output is coupled to the decoder circuitry;

a channel estimator coupled to the output of the despreader and for determining estimated channel impulse responses based on the despread symbol stream; and wherein the decoder circuitry is for decoding open loop diversity and closed loop diversity with respect to the despread symbol stream and in response to the estimated channel impulse responses.

12. The system of claim 11 wherein the receiver further comprises a deinterleaver coupled to an output of the decoder circuitry and for providing an inverse interleaving function with respect to information received from the decoder circuitry.

13. The system of claim 12 wherein the receiver further comprises a channel decoder coupled to an output of the deinterleaver and for improving a data error rate of information received from the deinterleaver.

14. The system of claim 1 wherein the signals comprise CDMA communications.

15. The system of claim 1 wherein the signals comprise WCDMA communications.

16. The system of claim 1 wherein the signals comprise TDMA communications.

17. The system of claim 1:

wherein the transmitter circuitry is located in a base station; and wherein the receiver comprises a mobile receiver.

18. The system of claim 1 wherein the plurality of symbols comprise quadrature phase shift keying symbols.

19. The system of claim 1 wherein the plurality of symbols comprise binary phase keying symbols.

20. The system of claim 1 wherein the plurality of symbols comprise quadrature amplitude modulation symbols.

21. The system of claim 1 wherein the transmitter circuitry further comprises:

a channel encoder for receiving a plurality of bits;

an interleaver coupled to an output of the channel encoder and for shuffling a block of encoded bits; and a symbol mapper coupled to an output of the interleaver for converting shuffled bits into the plurity of symbols.

22. A wireless communication receiver for receiving signal from transmitter circuitry transmitting along a plurality of sets of transmit antennas, wherein the signals are formed by the transmitter circuitry by applying space time block coded transmit antenna diversity to selected ones of the plurality of symbols such that signals transmitted by any one antenna in the set of antenas represent space time block coded open loop diversity with respect to signals transmitted by any other antenna in the set of antennas and wherein for each of the sets of antennas the encoder circuitry is for applying a weight to the plurality of symbols such that signals transmitted in response to the weight represent a closed loop diversity with respect to signals transmitted by any other antenna in any other of the uses of antennas, the receiver comprising a despreader having an output and for producing a despread symbol stream at the output in response to the signals; and decoder circuitry coupled to the output of the despreader and for decoding space time block coded open loop diversity and closed loop diversity with respect to the despread symbol stream.

23. The receiver of claim 22 and further comprising one antenna for receiving the signals transmitted from the plurality of transmit antennas.

24. The receiver of claim 22 and further comprising a plurality of antennas for receiving the signals transmitted from the plurality of transmit antennas.

25. The receiver of claim 22 and further comprising:

a channel estimator coupled to the output of the despreader and for determining estimated channel impulse responses based on the despread symbol stream; and wherein the decoder circuitry is for decoding space time block coded open loop diversity and closed loop diversity with respect to the despread symbol strum and in response to the estimated channel impulse responses.

26. The receiver of claim 25 and further comprising a deinterleaver coupled to an output of the decoder circuitry and for providing an inverse interleaving function with respect to information received from the decoder circuitry.

27. The system of claim 26 and further comprising a channel decoder coupled to an output of the deinterleaver and for improving a data error rate of information received from the deinterleaver.

28. A method of operating a wireless communication system, comprising the steps of receiving a plurality of symbols into encoder circuitry;

applying space time block coded open loop diversity and closed loop diversity to the plurality of symbols to form a plurality of signals; and transmitting the plurality of signals along a plurality of antenna to a receiver;

wherein the plurality of antennas comprises a plurality of sets of antennas; and wherein the step of applying space time block coded open loop diversity and closed loop diversity applies space time block coded open loop diversity to selected ones of the plurality of symbols such that signals transmitted by any one antenna in the set of antennas represent open loop diversity with respect to signals transmitted by any other antenna in the set of antennas.

29. The method of claim 28 wherein for each of the sets of antennas the step of applying open loop diversity and closed loop diversity applies a weight to the plurality of symbols such that signals transmitted in response to the weight represent a closed loop diversity with respect to signals transmitted by any other antenna in any other of the sets of antennas.

*30. A diversity encoder circuit for a wireless communication system, comprising:*

*an input terminal coupled to receive a first symbol and a second symbol, each symbol having plural data bits;*

*a first output terminal coupled to a first antenna and arranged to produce a product of a first scalar weight and one of the first symbol and a conjugate of the first symbol at a first time and a product of a second scalar weight and one of the second symbol and negative conjugate of the second symbol at a second time; and*

*a second output terminal coupled to a second antenna and arranged to produce a product of a third scalar weight and one of the second symbol and negative conjugate of the second symbol at the first time and a product of a fourth scalar weight and one of the first symbol and the conjugate of the first symbol at the second time.*

*31. A diversity encoder circuit as in claim 30, comprising:*

*a third output terminal coupled to a third antenna and arranged to produce a product of the third scalar weight and the first symbol at a first time and a product of the fourth scalar weight and the second symbol at a second time; and*

*a fourth output terminal coupled to a fourth antenna and arranged to produce a product of the first scalar weight and the negative conjugate of the second symbol at the first time and a product of the second scalar weight and the conjugate of the first symbol at the second time.*

*32. A diversity encoder circuit as in claim 31, wherein the first scalar weight is equal to the second scalar weight, and wherein the third scalar weight is equal to the fourth scalar weight.*

*33. A diversity encoder circuit as in claim 30, wherein the symbols comprise one of CDMA symbols, WCDMA symbols, and TDMA symbols.*

*34. A diversity encoder circuit as in claim 30, comprising a transmitter circuit located at a base station.*

*35. A diversity encoder circuit as in claim 30, wherein the first and second symbols comprise quadrature phase shift keying symbols.*

*36. A diversity encoder circuit as in claim 30, wherein the first and second symbols comprise quadrature amplitude modulation symbols.*

*37. A diversity encoder circuit as in claim 30, wherein the first and second symbols comprise binary phase shift keying symbols.*

*38. A diversity encoder circuit as in claim 30, wherein the first scalar weight is equal to the second scalar weight, and wherein the third scalar weight is equal to the fourth scalar weight.*

*39. A diversity decoder circuit for a wireless communication system, comprising:*

*an input terminal coupled to receive a product of a first scalar weight and one of a first symbol and a conjugate of the first symbol from a first antenna of a remote transmitter and a product of a third scalar weight and one of a second symbol and negative conjugate of the second symbol at a first time from a second antenna of the remote transmitter, wherein the input terminal is coupled to receive a product of a second scalar weight and one of the second symbol and negative conjugate of the second symbol and a product of a fourth scalar weight and one of the first symbol and the conjugate of the first symbol at a second time from the remote transmitter; and*

*a decoder coupled to the input terminal and producing the first symbol and the second symbol.*

*40. A diversity decoder circuit as in claim 39, wherein the first scalar weight is equal to the second scalar weight, and wherein the third scalar weight is equal to the fourth scalar weight.*

*41. A diversity decoder circuit as in claim 39, wherein the input terminal is coupled to receive the product of the first scalar weight and the first symbol and the product of the third scalar weight and the negative conjugate of the second symbol at the first time and the product of the second scalar weight and the second symbol and the product of the fourth scalar weight and the conjugate of the first symbol at the second time.*

*42. A diversity decoder circuit as in claim 41, wherein the input terminal is coupled to receive the product of the first scalar weight and the first symbol from the first antenna, the product of the third scalar weight and the negative conjugate of the second symbol from the second antenna, a product of the first scalar weight and the negative conjugate of the second symbol from a third antenna, and a product of the third scalar weight and the first symbol from a fourth antenna, and wherein the first, second, third, and fourth antennas are coupled to a remote transmitter.*

*43. A diversity decoder circuit as in claim 39, wherein the symbols comprise one of CDMA symbols, WCDMA symbols, and TDMA symbols.*

*44. A diversity decoder circuit as in claim 39, wherein the wireless communication system comprises a wireless user station.*

*45. A diversity decoder circuit as in claim 39, wherein the first and second symbols comprise quadrature phase shift keying symbols.*

*46. A diversity decoder circuit as in claim 39, wherein the first and second symbols comprise quadrature amplitude modulation symbols.*

*47. A diversity decoder circuit as in claim 39, wherein the first and second symbols comprise binary phase shift keying symbols.*

*48. A method of diversity encoding a signal for transmission to a remote wireless communication circuit, comprising the steps of:*

*producing a first product of a first weight and a first symbol at a first time;*

*producing a second product of a second weight and a second symbol at a second time;*

*producing a third product of a third weight and a negative conjugate of the second symbol at the first time;*

*producing a fourth product of a fourth weight and a conjugate of the first symbol at the second time;*

*applying the first and second products to a first antenna; and*

*applying the third and fourth products to a second antenna, wherein each of the first and second weights is determined in response to a channel effect between the first antenna and the remote wireless communication circuit, and wherein each of the third and fourth weights is determined in response to a channel effect between the second antenna and the remote wireless communication circuit.*

*49. A method as in claim 48, wherein the first weight is equal to the second weight, and wherein the third weight is equal to the fourth weight.*

*50. A method as in claim 48, comprising the steps of:*

*applying a product of the first weight and a negative conjugate of the second symbol to a third antenna at the first time;*

*applying a product of the second weight and the conjugate of the first symbol to the third antenna at the second time;*

*applying a product of the third weight and the first symbol to a fourth antenna at the first time; and*

*applying a product of the fourth weight and the second symbol to the fourth antenna at the second time.*

*51. A method as in claim 48, wherein the symbols comprise one of CDMA symbols, WCDMA symbols, and TDMA symbols.*

*52. A method as in claim 48, wherein the first and second symbols comprise quadrature phase shift keying symbols.*

*53. A method as in claim 48, wherein the first and second symbols comprise quadrature amplitude modulation symbols.*

*54. A method as in claim 48, wherein the first and second symbols comprise binary phase shift keying symbols.*

*55. A method as in claim 50, wherein the first weight is equal to the second weight, and wherein the third weight is equal to the fourth weight.*

*56. A method of diversity decoding a signal from a remote wireless communication circuit, comprising the steps of:*

*receiving a first product of a first weight and a first symbol at a first time from a first antenna of the wireless communication circuit;*

*receiving a third product of a third weight and a negative conjugate of a second symbol at the first time from a second antenna of the wireless communication circuit, wherein the first weight is determined in response to a channel effect from the first antenna of the remote wireless communication circuit, and wherein the third weight is determined in response to a channel effect from the second antenna of the remote wireless communication circuit;*

*decoding the first and third products; and*

*producing the first symbol and the second symbol.*

*57. A method as in claim 56, comprising the steps of:*

*receiving a second product of a second weight and the second symbol at a second time from the first antenna of the wireless communication circuit; and*

*receiving a fourth product of a fourth weight and a conjugate of the first symbol at the second time from the second antenna of the wireless communication circuit, wherein the second weight is determined in response to a channel effect from the first antenna of the remote wireless communication circuit, and wherein the fourth weight is determined in response to a channel effect from the second antenna of the remote wireless communication circuit.*

*58. A method as in claim 57, comprising the steps of:*

*receiving a product of the first weight and the negative conjugate of the second symbol from a third antenna at the first time;*

*receiving a product of the third weight and the first second symbol from a fourth antenna at the first time;*

*receiving a product of the second weight and the conjugate of the first symbol from the third antenna at the second time; and*

*receiving a product of the fourth weight and the second symbol from the fourth antenna at the second time.*

*59. A method as in claim 58, wherein the first weight is equal to the second weight, and wherein the third weight is equal to the fourth weight.*

*60. A method as in claim 56, comprising a wireless user station.*

*61. A method as in claim 56, wherein the first and second symbols comprise quadrature phase shift keying symbols.*

*62. A method as in claim 56, wherein the first and second symbols comprise quadrature amplitude modulation symbols.*

*63. A method as in claim 56, wherein the first and second symbols comprise binary phase shift keying symbols.*

*64. A method as in claim 57, wherein the first weight is equal to the second weight, and wherein the third weight is equal to the fourth weight.*

*65. A method of diversity encoding a signal for transmission to a remote wireless communication circuit, comprising the steps of:*

*receiving a plurality of data symbols including a first symbol and a second symbol, each symbol having plural data bits;*

*receiving a plurality of weights from the remote wireless communication circuit;*

*producing a first product of a first weight and the first symbol at a first time;*

*producing a second product of a second weight and a second symbol at a second time;*

*producing a third product of a third weight and a negative conjugate of the second symbol at the first time;*

*producing a fourth product of a fourth weight and a conjugate of the first symbol at the second time;*

*applying the first and second products to a first antenna; and*

*applying the third and fourth products to a second antenna.*

*66. A method as in claim 65, wherein the first and fourth weights are different.*

*67. A method as in claim 65, wherein the first weight is equal to the second weight, and wherein the third weight is equal to the fourth weight.*

*68. A method as in claim 65, wherein the first symbol comprises one of a CDMA symbol, a WCDMA symbol, and a TDMA symbol.*

*69. A method as in claim 65, wherein the first symbol comprises a quadrature phase shift keying symbol.*

*70. A method as in claim 65, wherein the first symbol comprises a quadrature amplitude modulation symbol.*

*71. A method as in claim 65, wherein the first symbol comprises a binary phase shift keying symbol.*

*72. A method of diversity decoding a signal from a remote wireless communication circuit, comprising the steps of:*

*receiving a first product of a first weight and a first symbol at a first time from a first antenna of the remote wireless communication circuit;*

*receiving a second product of a second weight and the second symbol at a second time from the first antenna of the remote wireless communication circuit;*

*receiving a third product of a third weight and a negative conjugate of a second symbol at the first time from the second antenna of the remote wireless communication circuit;*

*receiving a fourth product of a fourth weight and a conjugate of the first symbol at the second time from a second antenna of the remote wireless communication circuit; and*

*decoding the first and fourth products and producing the first symbol.*

*73. A method as in claim 72, wherein the first and fourth weights are different.*

*74. A method as in claim 72, wherein the first weight is equal to the second weight, and wherein the third weight is equal to the fourth weight.*

*75. A method as in claim 72, comprising receiving the first and fourth products at a wireless user station.*

*76. A method as in claim 72, wherein the first symbol comprises a quadrature phase shift keying symbol.*

*77. A method as in claim 72, wherein the first and second symbols comprise quadrature amplitude modulation symbols.*

*78. A method as in claim 72, wherein the first and second symbols comprise binary phase shift keying symbols.*

* * * * *